US012384162B2

(12) United States Patent
Okuyama et al.

(10) Patent No.: US 12,384,162 B2
(45) Date of Patent: Aug. 12, 2025

(54) LIQUID CARTRIDGE AND MANUFACTURING METHOD THEREOF TO ENSURE STABLE ATMOSPHERIC COMMUNICATION

(71) Applicant: CANON KABUSHIKI KAISHA, Tokyo (JP)

(72) Inventors: Norihisa Okuyama, Kanagawa (JP); Junichiro Iri, Kanagawa (JP); Hiroyuki Murayama, Oita (JP); Yusuke Hashimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 160 days.

(21) Appl. No.: 18/166,626

(22) Filed: Feb. 9, 2023

(65) Prior Publication Data

US 2023/0286280 A1 Sep. 14, 2023

(30) Foreign Application Priority Data

Mar. 8, 2022 (JP) ................................ 2022-035529

(51) Int. Cl.
*B41J 2/175* (2006.01)
*B41J 2/19* (2006.01)

(52) U.S. Cl.
CPC ....... *B41J 2/17523* (2013.01); *B41J 2/17503* (2013.01); *B41J 2/17513* (2013.01); *B41J 2/1752* (2013.01); *B41J 2/1753* (2013.01); *B41J 2/17556* (2013.01); *B41J 2/17559* (2013.01); *B41J 2/19* (2013.01); *B41J 2/17553* (2013.01)

(58) Field of Classification Search
CPC ................ B41J 2/17523; B41J 2/17503; B41J 2/17513; B41J 2/1752; B41J 2/1753; B41J 2/17556; B41J 2/17559; B41J 2/19; B41J 2/17553
See application file for complete search history.

(56) References Cited

U.S. PATENT DOCUMENTS

2003/0058315 A1* 3/2003 Lee ...................... B41J 2/17559 347/87
2006/0132562 A1* 6/2006 Nanjo .................. B41J 2/17513 347/86

FOREIGN PATENT DOCUMENTS

| | | | |
|---|---|---|---|
| JP | H0768778 | A | 3/1995 |
| JP | 2002192741 | A | 7/2002 |
| JP | 2003211686 | A | 7/2003 |
| JP | 2006142767 | A | 6/2006 |
| JP | 2007007902 | A | 1/2007 |
| JP | 2013158978 | A | 8/2013 |
| JP | 2015160401 | A | 9/2015 |

* cited by examiner

*Primary Examiner* — Henok D Legesse
(74) *Attorney, Agent, or Firm* — CANON U.S.A., INC. IP DIVISION

(57) ABSTRACT

A liquid cartridge that can easily ensure stable atmospheric communication can be provided, comprises a liquid storage portion configured to store liquid and a lid provided above the liquid storage portion, configured to cover the liquid storage portion. The lid has at least one inner opening on an inner side surface facing the liquid storage portion, a plurality of outer openings on an outer side surface which is a surface opposite the inner side surface and opens into an atmosphere, and an atmosphere communication channel connecting the at least one inner opening and the plurality of outer openings.

13 Claims, 7 Drawing Sheets

LIQUID CARTRIDGE AND MANUFACTURING METHOD THEREOF TO ENSURE STABLE ATMOSPHERIC COMMUNICATION

BACKGROUND

Field of the Disclosure

The present disclosure relates to a liquid cartridge and a manufacturing method thereof.

Description of the Related Art

Some ink cartridges (hereinafter referred to as a liquid cartridge) installed in inkjet printing apparatuses have atmosphere communication channels to maintain a constant pressure for ink. Japanese Patent Application Laid-Open No. 2003-211686 discloses a liquid cartridge equipped with a labyrinth-shaped atmosphere communication channel that bends along an up and down direction to prevent a leakage of ink from the liquid storage portion to the outside.

In the liquid cartridge disclosed in Japanese Patent Application Laid-Open No. 2003-211686, a blockage of the atmosphere communication channel or a reduction of the atmosphere communication channel can occur due to foreign matter adhering to the atmosphere communication channel or ink sticking inside the atmosphere communication passage. This phenomenon can make atmosphere communication unstable and make it difficult to maintain a constant internal pressure of the liquid cartridge.

SUMMARY

Aspects of the present disclosure provide a liquid cartridge that easily secures stable atmosphere communication.

A liquid cartridge of the present disclosure comprises a liquid storage portion configured to store liquid and a lid provided above the liquid storage portion, configured to cover the liquid storage portion. The lid has an inner opening on an inner side surface facing the liquid storage portion, a plurality of outer openings on an outer side surface which is a surface opposite the inner side surface and opens into an atmosphere, and an atmosphere communication channel connecting the inner opening and the plurality of outer openings.

Further features of the present disclosure will become apparent from the following description of embodiments with reference to the attached drawings.

DESCRIPTION OF THE EMBODIMENTS

Embodiments of the present disclosure are described below with reference to the drawings. In the following descriptions, the words upper direction, lower direction, upper part, lower part, etc., refer to a posture of a liquid cartridge when it is attached to a liquid ejecting apparatus such as an inkjet printer. That is, these terms are defined with reference to the posture in which the lid is positioned above the liquid storage portion and the liquid supply port is positioned below the liquid storage portion. In addition, although ink is used as an example of a liquid in the following embodiments and modifications, the liquid is not limited to ink, and any liquid that can be ejected from the liquid ejecting apparatus can be used.

First Embodiment

Figure 1A:
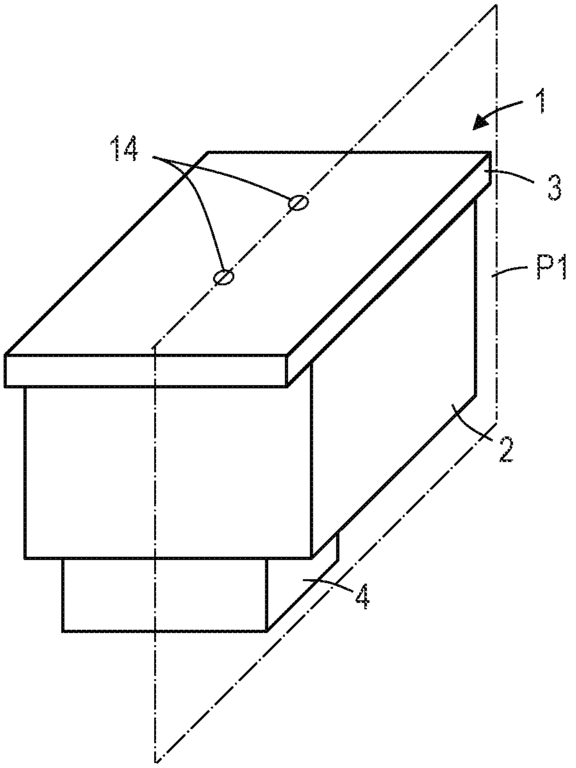
FIG. 1A is a schematic perspective view of a liquid cartridge according to a first embodiment of the present disclosure.
Figure 1B:
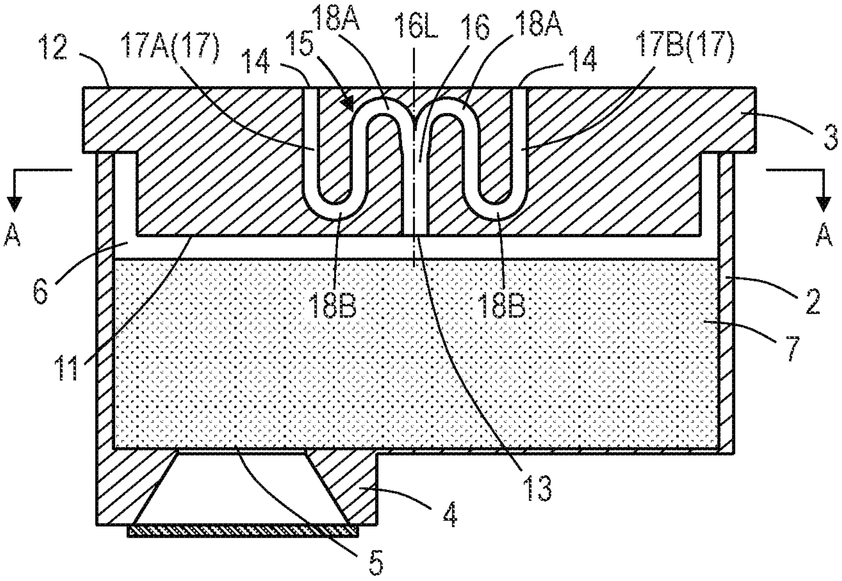
FIG. 1B is a cross-sectional view of the liquid cartridge according to the first embodiment of the present disclosure in plane P1 in FIG. 1A.
Figure 2A:
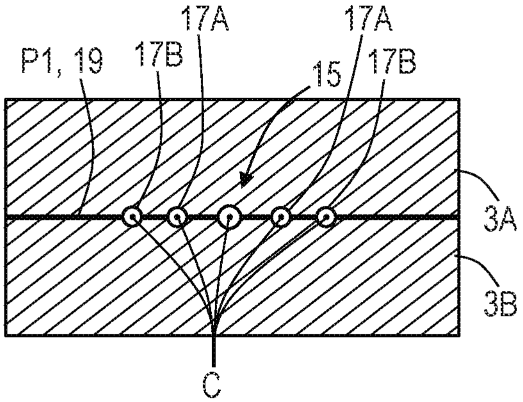
FIG. 2A is a cross-sectional view of the liquid cartridge according to the first embodiment of the present disclosure at line A-A in FIG. 1B.

FIGS. 1A and 1B are schematic diagrams of a liquid cartridge 1 according to the first embodiment of the present disclosure. FIG. 1A shows a perspective view of the liquid cartridge 1, and FIG. 1B shows a cross-sectional view in a first plane P1 of FIG. 1A. FIG. 2A also shows a cross-sectional view along line A-A of FIG. 1B. The liquid cartridge 1 has a liquid storage portion 2 for storing liquid and a lid 3 provided above the liquid storage portion 2 and covering the liquid storage portion 2. The liquid storage portion 2 and the lid 3 are manufactured by injection-molding resin. At a lower part of the liquid storage portion 2, a liquid ejecting head 4 is integrally formed with the liquid storage portion 2. The ink stored in the liquid storage portion 2 is supplied to the liquid ejecting head 4 through a liquid supply port 5 provided at the lower part of the liquid storage portion 2, and is ejected toward the printing medium from a liquid ejecting element (not shown) of the liquid ejecting head 4. Although the liquid ejecting element has an electrothermal converter (heater), any kind of liquid ejecting element, such as one utilizing a piezo element, can be used as long as it can impart energy for an ejection to the liquid. An absorber body 7 is arranged in the inner space 6 of the liquid storage portion 2 to maintain the ink at negative pressure, and the ink is absorbed and held by the absorber body 7. The ink consumed liquid cartridge 1 is replaced with a new liquid cartridge 1. In this disclosure, the liquid cartridge 1 may be replaceable, and may be integrated with or separate from the liquid ejecting head 4.

The lid 3 has an inner side surface 11 facing the liquid storage portion 2 and an outer side surface 12 which is a surface opposite the inner side surface 11. The outer side surface 12 contacts an atmosphere with the liquid cartridge 1 attached to a liquid ejecting apparatus. The inner side surface 11 of the lid 3 is provided with at least one inner opening 13, in this embodiment, communicating with the inner space 6 of the liquid storage portion 2. The outer side surface 12 of the lid 3 is provided with a plurality of outer openings 14 which open toward the atmosphere and two of outer openings 14 are provide in this embodiment. An atmosphere communication channel 15 connecting the inner opening 13 and the plurality of outer openings 14 is formed inside the lid 3. Although not shown, the lid 3 may be provided with a plurality of ribs (not shown) protruding downwardly from the inner side surface 11 and abutting on the absorber body 7. The rib presses the absorber body 7 downwardly so that the absorber body 7 abuts on the bottom of the liquid storage portion 2 and holds the absorber body 7 in a stable position.

The atmosphere communication channel 15 has a common channel 16, one end of which is connected to the inner opening 13, and a plurality of branching channels 17, branching from another end (branch point) of the common channel 16, each end of which is connected to each outer opening 14. The another end of the branching channel 17 coincides with the another end of the common channel 16. An atmosphere communication channel 15 communicates the inner opening 13 with each outer opening 14. Thus, even if the ink stored in the liquid storage portion 2 is consumed, the inner space 6 of the liquid storage portion 2 is maintained at approximately atmospheric pressure, and the ink can be stably supplied to the liquid ejecting head 4.

The plurality of branching channels 17 have, for example, a first branching channel 17A and a second branching channel 17B.

The channel area of each of the first branching channel 17A and the second branching channel 17B can be, for example, approximately ½ of the channel area of the common channel 16. A centerline of the first branching channel 17A and a centerline of the second branching channel 17B lie within the first plane P1. As described later, the first plane P1 functions as a dividing surface when the lid 3 is manufactured. As shown in FIG. 2A, the atmosphere communication channel 15, namely the common channel 16, the first branching channel 17A and the second branching channel 17B, has a circular cross section, and a centerline C of each channel lies within the first plane P1. Seen from the side or above, the first branching channel 17A and the second branching channel 17B are on both sides of the common channel 16. The first branching channel 17A and the second branching channel 17B are mirror-symmetrical with respect to a centerline 16L extending in the vertical direction of the common channel 16. Therefore, the shape, structure, channel length, and pressure loss of the first branching channel 17A and the second branching channel 17B are almost the same, allowing air to flow evenly between the first branching channel 17A and the second branching channel 17B. In addition, since the channel lengths or volumes of the first branching channel 17A and the second branching channel 17B can be the same, the possibility of early leakage of ink entering the branching channel with a short channel length, which can occur when the two channel lengths are different, is reduced. The cross-sectional shapes of the common channel 16, the first branching channel 17A and the second branching channel 17B are not limited to a circle, but may be a polygon such as a square, hexagon or octagon.

Figure 3:
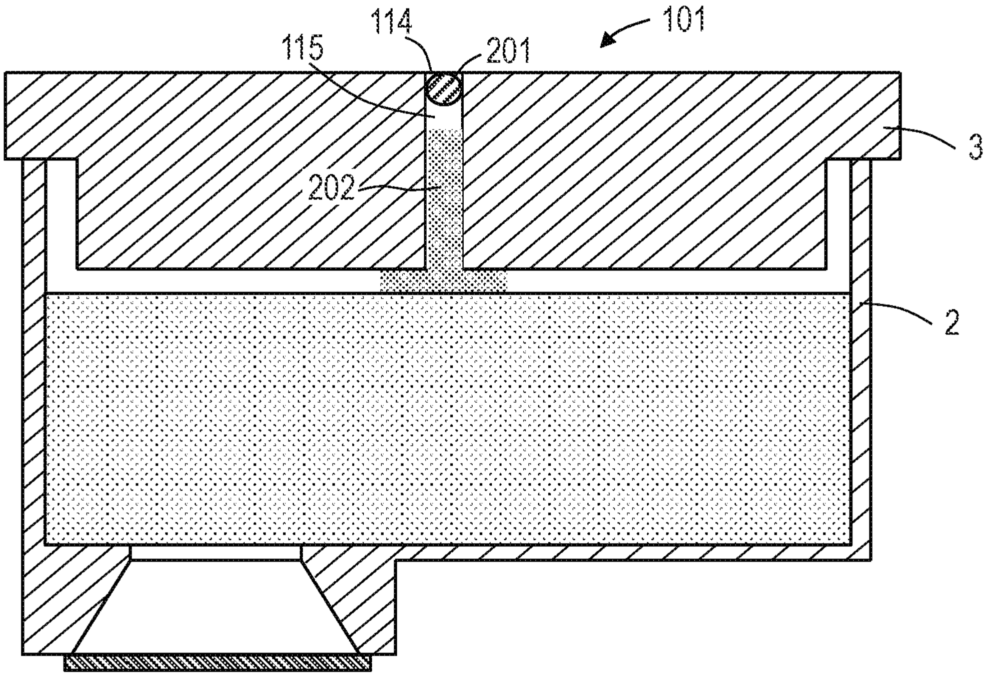
FIG. 3 is a schematic cross-sectional view of a liquid cartridge according to the comparative example.

As described above, since the outer side surface 12 of the lid 3 is in contact with the atmosphere, there is a possibility that the atmosphere communication channel 15 or the outer opening 14 is partially or totally blocked by dust entering the outer opening 14 or the atmosphere communication channel 15 or ink entering and adhering to the outer opening 14 or atmosphere communication channel 15, thereby preventing stable atmospheric communication. FIG. 3 shows a cross-sectional view of a comparative example of a liquid cartridge 101 with only one straight atmosphere communication channel 115. When foreign matter 201 enters the outer opening 114 or the atmosphere communication channel 115 connected to the outer opening 114, resulting in blockage or flow path reduction of the atmosphere communication channel 115, the atmospheric communication function is lost or reduced and stable atmospheric communication can not be obtained.

In this embodiment, two outer openings 14 are provided, and each of the outer openings 14 communicates with the inner space 6 of the liquid storage portion 2 via the first branching channel 17A, second branching flow passages 17B and the common channel 16. Therefore, even if blockage or flow path reduction occurs at one outer opening 14 or the branching channel 17 connected to the outer opening 14, stable atmospheric communication can be obtained by flowing air through another outer opening 14 and another branching channel 17 connected to the another outer opening 14. In addition, as will be described in detail later, there is a possibility that ink 202 may flow into the atmosphere communication channel 115, and the resulting ink 202 may become stuck by drying, resulting in blockage or flow path reduction of the atmosphere communication channel 115. However, as in the case of intrusion of foreign matter 201, stable atmospheric communication can be obtained because air flows through the outer opening 14 and the branching channel 17 communicating with the outer opening 14, where no blockage or channel reduction has occurred.

Due to vibrations or pressure fluctuations in the inner space 6 of the liquid storage portion 2, there is a possibility that the ink filled in the liquid storage portion 2 may leak through the atmosphere communication channel 15 from the outer opening 14 to the outside of the liquid cartridge 1. If an ink leak occurs during the manufacturing process (on the production line) of liquid cartridge 1, the manufacturing equipment could be contaminated with ink, which would contaminate subsequent liquid cartridges, causing the production of products judged to be defective. In addition, if leakage of ink occurs when the liquid cartridge 1 is attached to the liquid ejecting apparatus or while the liquid ejecting apparatus is in use, it may cause contamination of the user's hands or the inside of the liquid ejecting apparatus. There is a similar problem because the liquid cartridge 1 is susceptible to vibration and shock during transportation. As a comparative example, the atmosphere communication channel 115 has a simple linear shape, which makes it easy for ink to leak outside the liquid cartridge 101.

In this embodiment, as shown in FIG. 1B, the atmosphere communication channel 15 has a first bending portion 18A and a second bending portion 18B. More specifically, each of the first branching channel 17A and the second branching channel 17B has the first bending portion 18A and the second bending portion 18B. The second bending portion 18B is provided between the first bending portion 18A and the corresponding one of the outer openings 14. The ink flowing into the atmosphere communication channel 15 from the inner opening 13 firstly reaches the first bending portion 18A, and when the ink continues to flow out, it crosses the first bending portion 18A and reaches the second bending portion 18B. However, because the second bending portion 18B is provided between the first bending portion 18A and the outer opening 14 and is below the first bending portion 18A, the ink is captured at the second bending portion 18B and the possibility of leakage to the outside of the liquid cartridge 1 can be suppressed. In addition, since the atmosphere communication channel 15 has a branching channel 17 and the branching channel 17 increases the total volume of the atmosphere communication channel 15, the ink entering the atmosphere communication channel 15 from the liquid storage portion 2 is captured and the leakage of the ink is suppressed. In addition, since there are two branching channels 17A and 17B branching from one atmosphere communication channel 15, the possibility of ink entering the two branching channels at the same time is reduced, and even if the atmospheric communication state of one is reduced, the atmospheric communication can be stably maintained by the other functioning. The atmosphere communication channel 15 of this embodiment has a longer total channel length and a larger internal space than the atmosphere communication channel 115 of the comparative example, so that a larger amount of ink can be captured. Note that the first bending portion 18A and the second bending portion 18B consist of semicircular curved sections, so that air flows smoothly to obtain a stable atmospheric communication.

(Manufacturing Method of Lid 3)

Figure 2B:
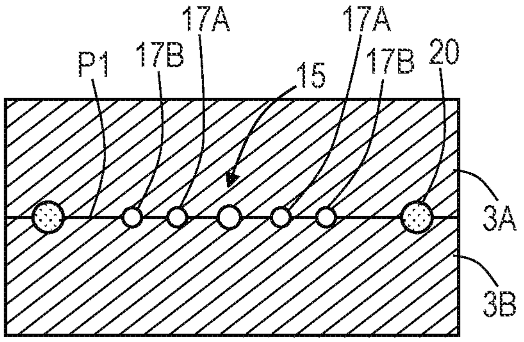
FIG. 2B is a cross-sectional view showing another example of a joining state of the lid of the liquid cartridge according to the first embodiment of the present disclosure.

The manufacturing method of the liquid cartridge 1 of this embodiment will be described. Since the liquid storage portion 2 and the liquid ejecting head 4 are manufactured by the same method as in the conventional method, the explanation of the manufacturing method of those are omitted, but only the manufacturing method of the lid 3 will be described. The atmosphere communication channel 15 can not be integrally formed by an injection molding because it has a branching part and the first bending portion 18A and the second bending portion 18B inside the lid 3. The lid 3 of this embodiment is manufactured by joining a plurality of parts divided by at least one dividing plane (one dividing plane in this embodiment) including the centerline of the atmosphere communication channel 15 with a bonding means. Specifically, the lid 3 is bisected by the first plane P1, and each bisected part is joined to each other by bonding means. An example of the bonding means is an adhesive 19 provided between two surfaces to be bonded, as shown in FIG. 2A. That is, adhesive 19 is applied to one of the opposing surfaces (first plane P1) of the two divided parts 3A and 3B of the lid 3, and the two divided parts 3A and 3B are attached and joined. Alternatively, the bonding means may be resin 20 filled in a channel extending along the two surfaces to be bonded, as shown in FIG. 2B. In this case, grooves are formed on the opposing surfaces (first plane P1) of the two divided parts 3A and 3B, and the two divided parts 3A and 3B are brought into close contact with each other so that the grooves are opposed to each other and a flow path is formed, and the molten resin 20 is poured into the flow path to perform the joining. Since the two grooves have a semicircular shape, a circular flow path is formed, but the shape of the flow path is not limited. Since the two divided parts 3A and 3B are each manufactured by injection molding, even if the shape of the atmosphere communication channel 15 is complicated, the influence on injection molding is limited. As long as the centerline C of the atmosphere communication channel 15 lies on the dividing plane for its entire length, the degree of freedom in the shape of the atmosphere communication channel 15 is high.

Figure 2C:
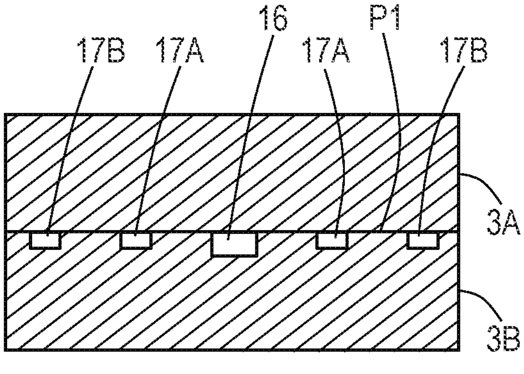
FIG. 2C is a cross-sectional view schematically showing yet another example.

FIG. 2C shows a modification of the shape of channel where at least one, preferably all, of the common channel 16, the first branching channel 17A and the second branching channel 17B have a rectangular cross section, and one side of the rectangle lies on the first plane P1. In this modification, a groove is formed only in one divided part 3B of two divided parts 3A and 3B to be bisected. Since the groove are not formed on the other divided part 3A, the lamination accuracy of the two divided parts 3A and 3B is relaxed. The cross sectional shapes of the common channel 16, the first branching channel 17A, and the second branching channel 17B are not limited to rectangles, but may have any shape that opens into the first plane P1.

Second Embodiment

Figure 4A:
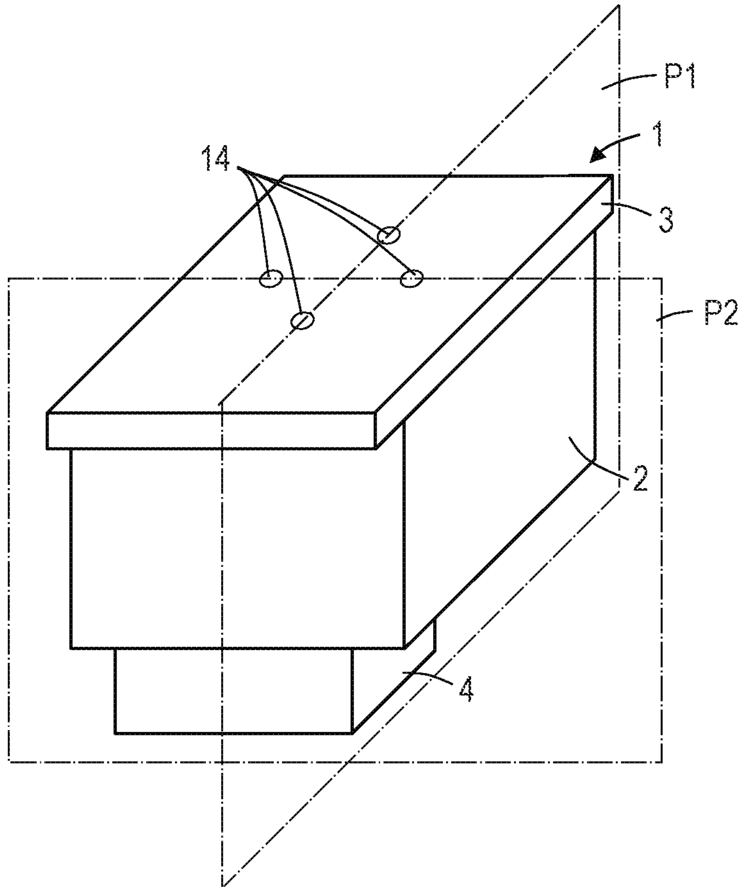
FIG. 4A is a schematic perspective view of a liquid cartridge according to a second embodiment of the present disclosure.
Figure 4B:
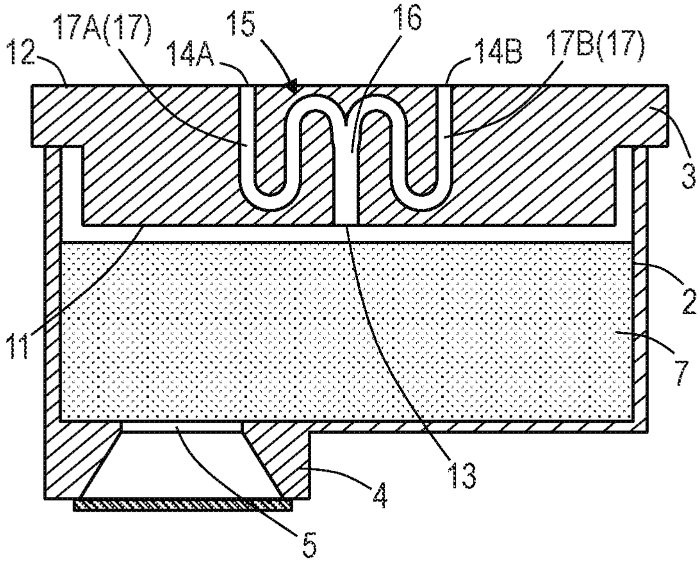
FIG. 4B is a cross-sectional view in plane P1 in FIG. 4A of the liquid cartridge according to the second embodiment of the present disclosure.
Figure 4C:
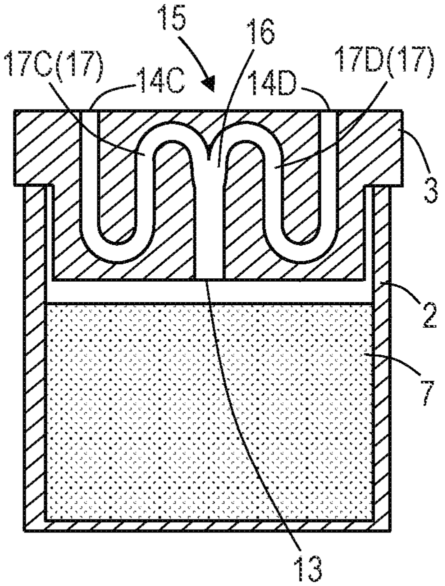
FIG. 4C is a cross-sectional view in plane P2 in FIG. 4A of the liquid cartridge according to the second embodiment of the present disclosure.

FIGS. 4A to 4C are schematic views of the liquid cartridge 1 according to the second embodiment of the present disclosure. FIG. 4A shows a perspective view of a liquid cartridge 1, FIG. 4B shows a cross-sectional view in a first plane P1 of FIG. 4A, and FIG. 4C shows a cross-sectional view in a second plane P2 of FIG. 4A. The second plane P2 is perpendicular to the first plane P1. The differences from the first embodiment will be explained here. The structure and effect without explanation are the same as in the first embodiment. In this embodiment, the lid 3 has four outer openings 14 (first to fourth outer openings 14A-14D), one inner opening 13, four branching channels 17 (first to fourth branching channels 17A-17D), and one common channel 16. The first to fourth branching channels 17A-17D branch from another end (branch) of the common channel 16, and each end is connected to the corresponding first to fourth outer openings 14A-14D. The centerlines of the first branching channel 17A and the second branching channel 17B lie in the first plane (on the first plane P1), and the centerlines of the third branching channel 17C and the fourth branching channel 17D lie in the second plane (on the first plane P2). That is, in this embodiment, the third branching channel 17C and the fourth branching channel 17D are added to the arrangement of the first embodiment. The branching positions of the first to fourth branching channels 17A-17D may be different from each other. For example, the first branching channel 17A and the second branching channel 17B may branch from the middle of the common channel 16, and the third branching channel 17C and the fourth branching channel 17D may branch from the end of the common channel 16. The first branching channel 17A and the second branching channel 17B are on both sides of the common channel 16, and the third branching channel 17C and the fourth branching channel 17D are also on both sides of the common channel 16. In the upward view, the first to fourth branching channels 17A-17D radially extend around the common channel 16 at 90 degrees intervals. The lid 3 is divided into four parts by the first plane P1 and the second plane P2, and the four divided parts are joined to each other by bonding means. In this embodiment, even if three branching channels 17 are blocked or reduced, the remaining one branching channel 17 enables stable atmospheric communication. In addition, since the amount of ink that can be captured increases with the increment of the number of the branching channels 17, the leakage of ink can be further suppressed.

(Modification)

The present disclosure is further capable of including several variations. Examples of these variations are described with reference to FIGS. 5A to 6D.

Figure 5A:
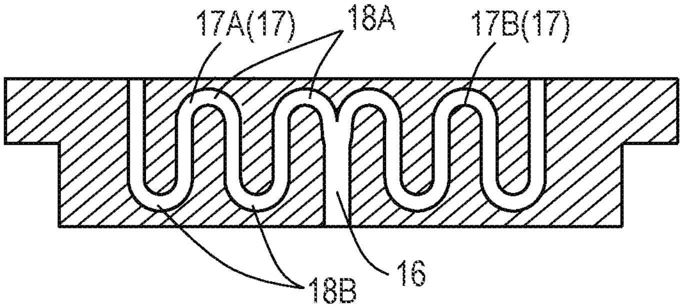
FIGS. 5A, 5B, 5C, and 5D are cross-sectional views of various modifications of the lid of the liquid cartridge, each to which the present disclosure is applied.

With reference to FIG. 5A showing one variation, each of the first branching channel 17A and the second branching channel 17B is provided with a plurality of first bending portions 18A and the second bending portions 18B, respectively, and the first bending portions 18A and the second bending portions 18B are arranged alternately. In the example shown in FIG. 5A, two sets of the first bending portion 18A and the second bending portion 18B are provided, but the number of sets of the first bending portion 18A and the second bending portion 18B may be three or more. By increasing the set of the first bending portion 18A and the second bending portion 18B, the amount of ink that can be captured by the branching channels 17 increases, so that the leakage of ink can be further suppressed.

Figure 5B:
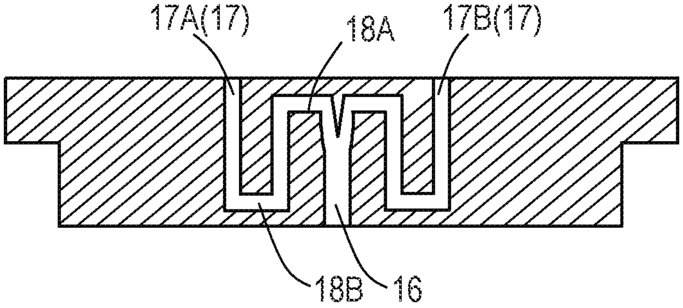

Referring to FIG. 5B showing another variation, the first bending portion 18A and the second bending portion 18B consist of a plurality of straight portions. The first bending portions 18A and the second bending portion 18B are composed of a plurality of straight lines that bend at right angles, but more straight lines may be connected at a bend angle of less than 90 degrees. This modification achieves the same effect as the first embodiment.

Figure 5C:
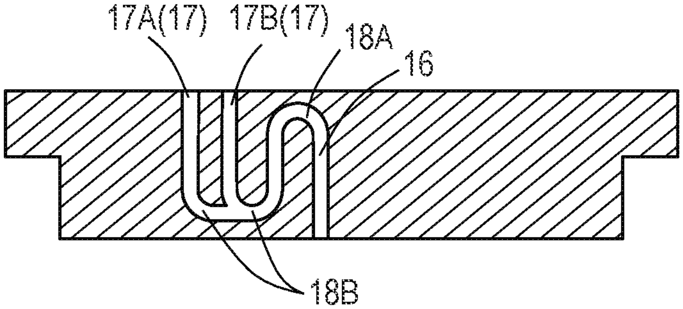
Figure 5D:
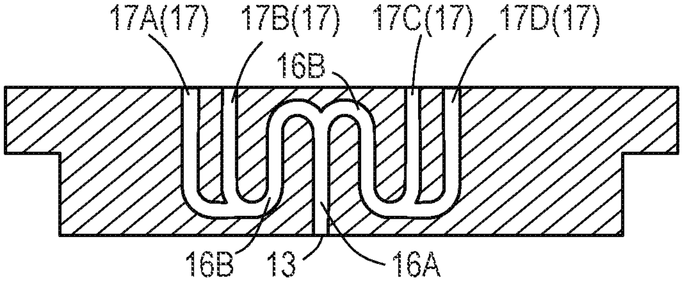

Referring to FIG. 5C showing yet another variation, the first branching channel 17A and the second branching channel 17B are on one side of the common channel 16. The atmosphere communication channel 15 has one first bending portion 18A and two second bending portions 18B. The first bending portion 18A is provided in the common channel 16, and one of the second bending portions 18B is provided on the branch position of the first branching channel 17A and another of the second bending portions 18B is provided on the branch position of the second branching channel 17B. FIG. 5D shows a variation of the arrangement shown in FIG. 5C. The atmosphere communication channel 15 has a first common channel 16A with one end in the inner opening 13, two second common channels 16B branching from another end of the first common channel 16A, and first to fourth branching channels 17A-17D branching from each of the two second common channels 16B respectively. One of the second common channels 16B, the first branching channel 17A, and the second branching channel 17B are on one side of the first common channel 16A. Another of the second common channels 16B, the third branching channel 17C, and the fourth branching channel 17D are on another side of the first common channel 16A. The centerlines of the first common channel 16A, the two of the second common channels 16B, and the first to fourth branching channels 17A-17D are all in the first plane P1. This modification has four branching channels and has the same effect as the second embodiment, but can be manufactured by dividing the lid 3 into two parts, which improves the ability to fabricate compared with the second embodiment.

Figure 6A:
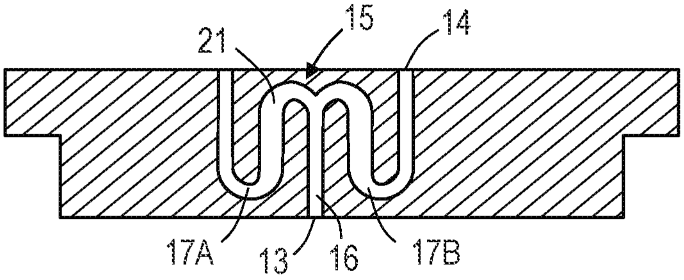
FIGS. 6A, 6B, 6C, and 6D are cross-sectional views of different variations of the lid member of the liquid cartridge, each to which the present disclosure is applied.

Referring to FIG. 6A, the atmosphere communication channel 15 has an enlarged diameter portion 21 with a cross-sectional area larger than that of the inner opening 13 and the plurality of outer openings 14. In this embodiment, the enlarged diameter portion 21 is provide on the first branching channel 17A and the second branching channel 17B, but the enlarged diameter portion 21 may be provided in the common channel 16, or in the common channel 16, the first branching channel 17A, and the second branching channel 17B. In this modification, the amount of ink that can be captured without changing the total length of the atmosphere communication channel 15 increases, so that the leakage of ink can be further suppressed. In particular, it is preferable that the cross-sectional area of the enlarged diameter portion 21 is larger than that of the outer opening 14. It is possible to make the diameter of the outer opening 14 smaller as compared with the first embodiment, and thus, the entry of foreign matter from the outer opening 14 can be more suppressed.

Figure 6B:
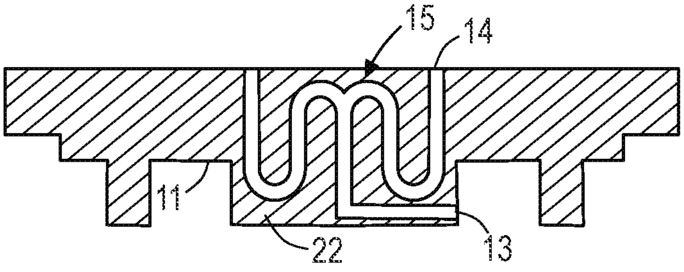

Referring to FIG. 6B showing the yet another modification, the lid 3 has a first rib 22 protruding from the inner side surface 11, and a part of the atmosphere communication channel 15 is provided in the first rib 22. As described above, the lid 3 may be provided with a rib to press the absorber body 7, and in this modification, a part of this rib is utilized as the first rib 22. To avoid interference with the absorber body 7, the inner opening 13 is provided on a side surface of the first rib 22. In this modification, the installation range in a height direction of the atmosphere communication channel 15 is expanded.

The possibility of ink entering the common channel 16 can be reduced by the inner opening 13 facing sideways. In addition, the total length of the atmosphere communication channel 15 is increased, which increases the amount of ink that can be captured, so that ink leakage can be further suppressed.

Figure 6C:
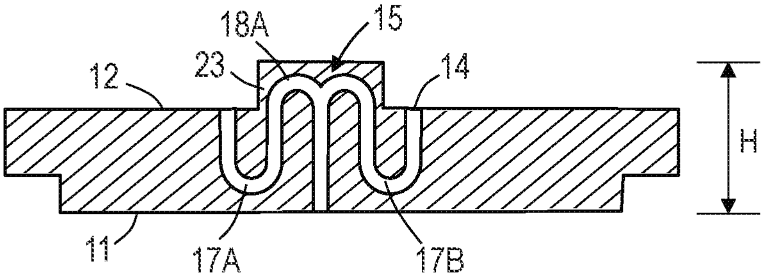
Figure 6D:
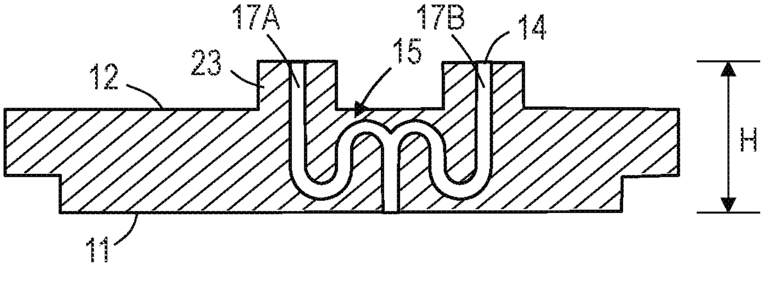

With reference to FIGS. 6C and 6D showing the yet another modification, the lid 3 has a second rib 23 protruding from the outer side surface 12, and a part of the atmosphere communication channel 15 is provided in the second rib 23. In the example shown in FIG. 6C, the first bending portion 18A is provided in the second rib 23, and in the example shown in FIG. 6D, the vicinity of the outer opening 14 of the first branching channel 17A and the outer opening 14 of the second branching channel 17B are provided in the second rib 23. Even in this modification, the installation range in a height direction of the atmosphere communication channel 15 is expanded, so that the leakage of ink can be further suppressed for the same reason as in the modification shown in FIG. 5B. When the installation range (dimension H) in the height direction of the atmosphere communication channel 15 is equivalent to, for example, the first embodiment, the inner side surface 11 of the lid 3 can be installed at a higher position. Thus, the ink capacity of the liquid storage portion 2, that is, the ink capacity of the liquid cartridge 1 can be increased. The modification shown in FIG. 6B and the modifications shown in FIGS. 6C and 6D can be combined with each other.

Figure 7A:
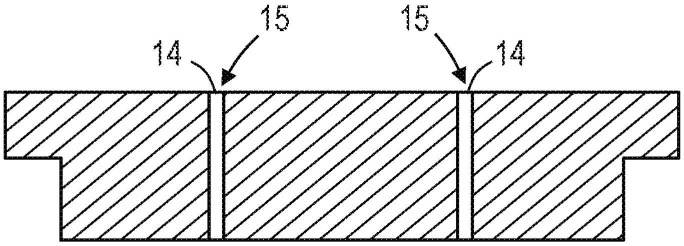
FIGS. 7A and 7B are cross-sectional views of yet another variety of variations of the lid of the liquid cartridge, each to which the present disclosure is applied.
Figure 7B:
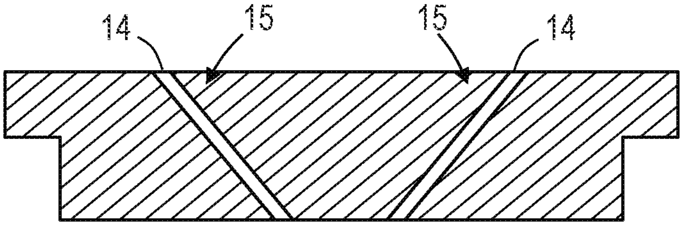

Referring to FIGS. 7A and 7B showing the yet other modifications, a plurality of atmosphere communication channels 15 are provided. In the modification shown in FIG. 7A, two of a straight atmosphere communication channel 15 extending in the vertical direction are provided. In the modification shown in FIG. 7B, two of a rectilinear atmosphere communication channel 15 extending diagonally are provided. Since a plurality of outer openings 14 are provided, stable atmospheric communication can be obtained by allowing air to flow through the other atmosphere communication channel 15 even if blockage or flow path reduction occurs in one atmosphere communication channel 15. The modification shown in FIG. 7B has the atmosphere communication channel 15 longer than that of the modification shown in FIG. 7A, so ink leakage can be suppressed compared with the modification shown in FIG. 7A. Although not shown in the figure, more than one atmospheric communication channel 15 may be provided for each of the above embodiments and modifications to further suppress ink leakage. The number of atmosphere communication channel 15 is not limited to two, but may be three or more.

As is clear from the embodiments and modifications as described above, according to the present disclosure, a liquid cartridge that can easily ensure stable atmospheric communication can be provided.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-035529, filed Mar. 8, 2022, which is hereby incorporated by reference herein in its entirety.

What is claimed is:

1. A liquid cartridge comprising:

a liquid storage portion configured to store liquid; and a lid provided above the liquid storage portion, configured to cover the liquid storage portion, and including an inner opening on an inner side surface facing the liquid storage portion, a plurality of outer openings on an outer side surface, which is a surface opposite the inner side surface, and opens into an atmosphere, and an atmosphere communication channel connecting the inner opening and the plurality of outer openings, wherein the atmosphere communication channel has a common channel with one end communicating with the inner opening, and a plurality of branching channels branching from another end of the common channel and communicating with the plurality of outer openings.

2. The liquid cartridge according to claim 1, wherein the plurality of branching channels has a first branching channel and a second branching channel, and the first branching channel and the second branching channel are provided on opposite sides of the common channel.

3. The liquid cartridge according to claim 2, wherein the plurality of branching channels further has a third branching channel and a fourth branching channel, and the third branching channel and the fourth branching channel are provided at positions intersecting the first branching channel and the second branching channel.

4. The liquid cartridge according to claim 1, wherein the plurality of branching channels has a first branching channel and a second branching channel, and the first branching channel and the second branching channel are provided on one side of the common channel.

5. The liquid cartridge according to claim 4, wherein the plurality of branching channels further have a third branching channel and a fourth branching channel, and the third branching channel and the fourth branching channel are provided on another side of the common channel.

6. The liquid cartridge according to claim 1, wherein the branching channel of the atmospheric communication channel has a first bending portion and a second bending portion, and the second bending portion is provided between the first bending portion and any of the outer openings and below the first bending portion.

7. The liquid cartridge according to claim 6, wherein the first bending portion includes a semicircular curved portion and the second bending portion includes a semicircular curved portion.

8. The liquid cartridge according to claim 6, wherein the first bending portion includes a plurality of straight portions and the second bending portion includes a plurality of straight portions.

9. The liquid cartridge according to claim 6, wherein the first bending portion and the second bending portion are provided in plural numbers, respectively, and the first bending portions and the second bending portions are arranged alternately.

10. The liquid cartridge according to claim 1, wherein each of the plurality of branching channels has an enlarged diameter portion of which a cross-sectional area is larger than the plurality of outer openings.

11. The liquid cartridge according to claim 1, wherein the lid has a first rib protruding from the inner side surface, and a part of the atmosphere communication channel is provided in the first rib.

12. The liquid cartridge according to claim 1, wherein the lid has a second rib protruding from the outer side surface, and a part of the atmosphere communication channel is provided in the second rib.

13. A method of manufacturing a liquid cartridge comprising a liquid storage portion configured to store liquid, and a lid that is provided above the liquid storage portion, configured to cover the liquid storage portion, the lid having an inner opening on an inner side surface facing the liquid storage portion, a plurality of outer openings on an outer side surface, which is a surface opposite the inner side surface, and opens into an atmosphere, and an atmospheric communication channel connecting the inner opening and the plurality of outer openings, and being manufactured by joining divided bodies, the method comprising:

manufacturing a groove on at least one of the divided bodies; and manufacturing the lid including the atmosphere communication channel by joining the divided bodies with an adhesive means, wherein the atmospheric communication channel has a common channel with one end communicating with the inner opening, and a plurality of branching channels branching from another end of the common channel and communicating with the plurality of outer openings, and further comprising a step of manufacturing the lid having the atmosphere communication channel including the plurality of branching channels, by joining the divided bodies which corresponds to bodies obtained by dividing the lid into two or four bodies.

* * * * *